(12) United States Patent
Hirsch

(10) Patent No.: US 7,385,301 B2
(45) Date of Patent: *Jun. 10, 2008

(54) WAVE ENERGY CONVERSION SYSTEM

(76) Inventor: William Walter Hirsch, 9361 Folkstone Cir., Huntington Beach, CA (US) 92646

( * ) Notice: Subject to any disclaimer, the term of this patent is extended or adjusted under 35 U.S.C. 154(b) by 0 days.

This patent is subject to a terminal disclaimer.

(21) Appl. No.: 11/758,221

(22) Filed: Jun. 5, 2007

(65) Prior Publication Data

US 2007/0228737 A1 Oct. 4, 2007

Related U.S. Application Data

(60) Division of application No. 11/673,631, filed on Feb. 12, 2007, which is a continuation of application No. 10/703,952, filed on Nov. 7, 2003, now Pat. No. 7,199,481.

(51) Int. Cl.
  *F03B 13/10* (2006.01)
  *F03B 13/12* (2006.01)
  *F03B 13/00* (2006.01)
  *H02P 9/04* (2006.01)

(52) U.S. Cl. .......................... 290/42; 290/53

(58) Field of Classification Search ............. 290/42, 290/43, 53, 54; 60/495; 417/331; 416/85
  See application file for complete search history.

(56) References Cited

U.S. PATENT DOCUMENTS 321,229 A  6/1885  Leavitt
404,488 A  6/1889  Johnson
647,638 A  4/1900  Todd et al.
672,085 A  4/1901  Tingley et al.
879,992 A  2/1908  Wilson
892,567 A  7/1908  Thrasher et al.
1,025,929 A  5/1912  Snook
1,202,290 A  10/1916  Hill
1,244,309 A  10/1917  Fox
1,439,984 A  12/1922  Talbert
1,823,190 A  9/1931  Christie
2,109,173 A  2/1938  Herndon
3,126,830 A  3/1964  Dillner (Continued)

OTHER PUBLICATIONS

Classroom Energy; http://www.cassroomenergy.org/teachers/energy_tour/pg6.html; Energy Sources, Energy Choices; pp. 1-7, Jun. 18, 2003.

(Continued)

*Primary Examiner*—Julio C. Gonzalez
(74) *Attorney, Agent, or Firm*—Howison & Arnott, L.L.P.

(57) ABSTRACT

A wave energy conversion system converts wave energy within a wave medium into electrical energy. The wave energy conversion system includes a base substantially connected to a wave-medium floor, a tidal platform connected to the base and a tidal float connected to the tidal platform. An axle is connected to the tidal platform with an inductive coil positioned within the axle, such that an axis of the inductive coil is parallel to the axle. A magnetic sleeve includes a magnetic sleeve opening, such that the axle passes through the magnetic sleeve opening. A float member is connected to the magnetic sleeve. A wave moving through the wave causes displacement of the float member, causing the magnetic sleeve to move relative to the inductive coil and generate electrical energy within the inductive coil.

11 Claims, 11 Drawing Sheets

U.S. PATENT DOCUMENTS

| | | | |
|---|---|---|---|
| 3,204,110 A | 8/1965 | Masuda | |
| 3,231,749 A | 1/1966 | Hinck, III | |
| 3,487,228 A | 12/1969 | Kriegel | |
| 3,546,473 A * | 12/1970 | Rich | 290/42 |
| 3,631,670 A | 1/1972 | Vassilakis | |
| 3,696,251 A | 10/1972 | Last et al. | |
| 3,772,669 A * | 11/1973 | Johnston et al. | 327/304 |
| 3,783,302 A | 1/1974 | Woodbridge | |
| 3,894,241 A | 7/1975 | Kaplan | |
| 3,965,365 A | 6/1976 | Parr | |
| 4,034,231 A * | 7/1977 | Conn et al. | 290/53 |
| 4,110,630 A * | 8/1978 | Hendel | 290/53 |
| 4,151,423 A * | 4/1979 | Hendel | 290/42 |
| 4,191,893 A | 3/1980 | Grana et al. | |
| 4,260,901 A | 4/1981 | Woodbridge | |
| 4,266,143 A | 5/1981 | Ng | |
| 4,271,924 A | 6/1981 | Chelminski | |
| 4,291,234 A | 9/1981 | Clark | |
| 4,326,840 A | 4/1982 | Hicks et al. | |
| 4,359,868 A | 11/1982 | Slonim | |
| 4,408,454 A | 10/1983 | Hagen et al. | |
| 4,408,455 A | 10/1983 | Montgomery | |
| 4,421,461 A | 12/1983 | Hicks et al. | |
| 4,441,872 A * | 4/1984 | Seale | 417/282 |
| 4,447,740 A | 5/1984 | Heck | |
| 4,539,485 A | 9/1985 | Neuenschwander | |
| 4,568,836 A | 2/1986 | Reenberg | |
| 4,594,853 A | 6/1986 | Raichlen et al. | |
| 4,622,473 A | 11/1986 | Curry | |
| 4,630,440 A | 12/1986 | Meyerand | |
| 4,803,839 A | 2/1989 | Russo, III | |
| 4,843,250 A | 6/1989 | Stupakis | |
| 4,931,662 A | 6/1990 | Burton | |
| 4,996,840 A | 3/1991 | Marx | |
| 5,136,137 A | 8/1992 | Schlienger | |
| 5,311,064 A | 5/1994 | Kumbatovic | |
| 5,324,169 A | 6/1994 | Brown et al. | |
| 5,359,229 A | 10/1994 | Youngblood | |
| 5,426,332 A | 6/1995 | Ullman et al. | |
| 5,554,922 A | 9/1996 | Kunkel | |
| 5,696,413 A * | 12/1997 | Woodbridge et al. | 310/15 |
| 5,842,838 A | 12/1998 | Berg | |
| 5,946,909 A | 9/1999 | Szpur | |
| 6,132,180 A | 10/2000 | Kojima | |
| 6,229,225 B1 | 5/2001 | Carroll | |
| 6,392,314 B1 | 5/2002 | Dick | |
| 6,476,511 B1 | 11/2002 | Yemm et al. | |
| 6,515,375 B1 | 2/2003 | Beal | |
| 6,570,275 B2 | 5/2003 | Kim et al. | |
| 6,644,027 B1 | 11/2003 | Kelly | |
| 6,700,217 B1 | 3/2004 | North et al. | |
| 6,731,018 B1 | 5/2004 | Grinsted et al. | |
| 6,864,592 B1 | 3/2005 | Kelly | |
| 2004/0071566 A1 | 4/2004 | Hill | |

OTHER PUBLICATIONS

Energy Harvesting—"Frictionless" Linear Electrical Generator for Harvesting Motion Energy; Rockwell Scientific; http://www.rockwellscientific.com/energyharvesting/, Jun. 18, 2003.

First Patent we know to utilize the energy of ocean waves, filed in Paris, France 1799, by the Girards, father and son; pp. 1-7.

Ocean Motion Project; Ocean Wave Energy Converter; http://members.tripod.com/~MHouser/; pp. 1-2, Jun. 18, 2003.

Ocean Power Technologies; Technology, PowerBouy Operation; http://www.oceanpowertechnologies.com/technology; pp. 1-3, Jun. 18, 2003.

Wave Energy,—Solar cars, Electric and Hybrid Vehicles; David Rezachek's Home Page; http://home.hawaii.rr.com/rezachek/wavenpg1.htm, Jun. 18, 2003.

* cited by examiner

WAVE ENERGY CONVERSION SYSTEM

CROSS REFERENCE TO RELATED APPLICATIONS

This Application is a Divisional Application of U.S. application Ser. No. 11/673,631, filed Feb. 12, 2007, and entitled WAVE ENERGY CONVERSION SYSTEM, now U.S. Pat. No. 7,298,054, issued on Nov. 20, 2007; which is a Continuation of U.S. patent application Ser. No. 10/703,952 filed Nov. 7, 2003, and entitled WAVE ENERGY CONVERSION SYSTEM, now U.S. Pat. No. 7,199,481, issued on Nov. 7, 2003.

TECHNICAL FIELD OF THE INVENTION

The invention relates to wave-energy conversion devices, particularly to point absorber wave-energy conversion systems, comprising in part an underwater device which derives power from buoyancy variations arising from changes in pressure caused by waves and/or changes in the level on the surface above and which reacts against a platform that changes level in accordance with tidal level changes.

BACKGROUND OF THE INVENTION

The petroleum crisis in the early 1970's was the impetus for significant innovation in wave energy conversion systems. A lack of practical solutions or reasonable prospects of efficient and robust technologies, plus declining oil prices, eventually led to a general disenchantment in the viability of wave-energy conversion.

Research continued at a few largely academic centers and over the past twenty-five years a great deal has been learned. Both theoretical understanding of sea waves and technical expertise in related marine engineering has gained immeasurably from the offshore oil and gas industries during the same period. Growing concern with global climate change has led to an increased sense of urgency in the quest for commercially viable renewable energy sources.

The theoretical potential of wave energy has been recognized for many years. The size of this resource has been estimated to be 219 gigawatts along the coats of the European Union, or more than 180 terawatt hours each year. The wave power off the west coasts of Ireland and Scotland, where the winter resource is approximately twice that available during summer months, ranks with the highest levels per kilometer in the World.

Wave energy is lost by friction with the sea bottom as the sea becomes shallow, with water depths of half a wavelength or less. This is most pronounced where wavelengths tend to be long, as off the NW coast of Europe.

Research and development into wave energy converters (WECs) over the past twenty-five years, plus the knowledge and practical experience gained from the off-shore oil and gas industries, has now reached a stage where robust and effective wave energy converters with installed capacities of one megawatt and greater are being developed.

The wave energy resource may be split into three broad categories, based on where the energy from waves may be recovered: 1. in the open sea, i.e. offshore; 2. on or close to the shore line, i.e. on-shore or inshore; 3. outside the normal area of breaking waves but not in the deep ocean, i.e. near shore.

A fourth category, not generally considered in the context of wave energy converters, but which may be of relevance to this present invention, is waves or surges in a liquid contained in vessels and tanks.

The very large number of devices and concepts proposed to date has been classified and described in summary form for the Engineering Committee on Oceanic Resources by the Working Group on Wave Energy Conversion (ECOR draft report, April 1998). This follows a similar classification based on the intended location, i.e. off-shore, near shore to off-shore, and on-shore.

Wave Energy Converters (WECs) may also be classified in different ways according to their operating principle and the ways in which they react with waves. In terms of practical application, only a very few types of device are presently, or in the recent past have been, in use or under test in European waters.

By way of illustration, two different but overlapping classes will be briefly commented on: the Oscillating Water Column (OWC) devices and Point Absorbers, the latter being the relevant class in the present context.

OWC devices are typically those where the wave is confined in a vertical tube or a larger chamber and, as it surges back and forth, drives air through a power conversion device. Megawatt-scale OWC devices are now at an advanced stage of development.

One such device, being built in a rocky gully on the western shore of Pico in the Azores, is a reinforced concrete chamber partly open at one side to the waves, and with two turbines above and behind through which the confined air is forced. These are specially developed Wells turbines (one with variable blade pitch) and on the whole would seem to be the best-developed and perfected conversion system available today. It is, however, unlikely that any one such installation will have an installed capacity greater than two megawatts and the number of suitable sites has to be extremely limited.

Point absorbers may react against the sealed (therefore necessarily sited near-shore), or be floating and self-reacting. Theoretical analysis has greatly increased our understanding of point absorbers.

Point absorbers are usually axi-symmetric about a vertical axis, and by definition their dimensions are small with respect to the wavelength of the predominant wave. The devices usually operate in a vertical mode, often referred to as 'heave'. As such they are capable of absorbing energy arising from changes in the surface level rather than from forward motion of breaking seas.

The theoretical limit for the energy that can be absorbed by an isolated, heaving, axi-symmetrical device has been shown to depend on the wavelength of the incident waves rather than the cross section of the device, i.e. from the wavelength divided by 2.pi. Thus the wavelength is a critically important criterion, resulting in the attraction of locating the point absorber devices well outside the region of breaking waves, and where they will be open to long wavelength ocean swell or 'heave'.

A point absorber device may react against the inherent inertia of one of its components, or against the bottom of the sea. Thus, point absorbers may be deployed near-shore in contact with the sea-bed or, in the case of self-reacting devices, near-shore or off-shore.

Small-scale practical point absorbers such as fog horns and navigation buoys, both of which may incorporate OWCs, have been in use for decades. Typically these have a power of a few hundred watts.

One new point absorber device, now claimed to be capable of generating of the order of a megawatt, has been described. This is based on the buoyancy variations of a submerged, partly air filled, rigid vessel open at the bottom. Initially the device is floating with neutral buoyancy at a certain depth.

If a wave passes above it the pressure around this vessel increases and water will flow into the vessel, displacing the air or gas inside (which is free to flow to a large reservoir or to similar devices linked by pipelines), decreasing the air volume in it and hence its buoyancy. The upthrust experienced has decreased in proportion to the volume of water displaced, i.e. Archimedes' principle. The partially filled vessel will start to sink. When a trough passes above it the reverse process occurs, and the vessel tends to rise to recover its rest position.

The size of the forces exerted will depend on the extent of the water surface within the vessel, the amplitude of the wave and the frequency of waves. The wave energy transformer is described in terms of two similar containers, horizontally displaced, such that the gas displaced from one container passes to the second. Essentially the gas, being free to move between two or more similar devices remains under constant pressure, as required by the depth below the surface.

This is a heavily engineered device, one that will not readily flex with the lateral movements of water as found below waves, it is not independent of the seabed and is not independent of tidal changes in mean sea level. The base or center of the device is fixed in its position with respect to the seabed.

A common problem with existing devices designed to harvest significant amounts of energy from the sea is their complexity and cost. They are predominantly large structures, with rigid components, placed in a harsh environment. There is little use of well-proven components. Most devices proposed are very demanding in terms of engineering design, deployment and maintenance.

Other known devices which are used in the marine environment, although not designed for the conversion of wave energy to usable power include devices designed to pump fluids from the sea-bed.

The term "wave motion" as used herein refers to both waves on a surface of a liquid and swell in a body of a liquid.

Ocean waves represent a significant energy resource. It is known to use a Wave Energy Converter to extract power from such waves. Known Wave Energy Converters tend to be expensive, and have limited prospects for survival in extreme conditions.

A variety of devices may be used to provide relatively small amounts of power for use in small devices intended for long life in inaccessible locations. For example, to perform long endurance military missions, small unattended sensors or robots need more electrical power to sense, communicate, or move than they can practically carry in a pre-charged power storage device. This means that they must be able to harvest energy from their environment during the mission to periodically re-charge their power sources.

The small size of the devices typically used in military systems makes it difficult to collect a useful amount of power since natural energy usually occurs as a "flux", and the amount available for collection depends on the physical capture area.

The amount of energy or power available in waves is enormous and this power is generally recognized by the damage caused. Thus, waves are usually regarded as a hindrance rather than an asset. For example, at Wick Breakwater in Scotland a block of cemented stones weighing 1,350 tons was broken loose and moved bodily by waves. Several years later, a replacement pier weighing 2,600 tons was carried away.

In other instances, a concrete block weighing 20 tons was lifted vertically to a height of 12 feet and deposited on top of a pier 5 feet above the highwater mark; stones weighing up to 7,000 pounds have been thrown over a wall 20 feet high on the southern shore of the English Channel; and on the coast of Oregon, the roof of a lighthouse 91 feet above the water was damaged by a rock weighing 135 pounds.

Heretofore this enormous amount of power available in the world's oceans has been largely ignored. One reason for this lack of utilization of the available energy in the world's oceans is their very power. In other words, most devices which have been designed for capturing or converting the energy of waves to useful work have been destroyed or damaged by that very energy.

This is at least partly due to the irregularity of waves which can cause jerky or irregular motion of wave energy devices. Moreover, storms frequently occur during which time wave action can become violent, thus destroying installations erected for converting the energy of the waves to useful work.

Other prior art devices are not efficient in operation and convert only a very small portion of the available wave energy. For example, the actual propagation or movement of water particles in a lateral direction is only about one percent of the velocity of travel of waves. Thus, while devices floating on the surface of a body of water may be utilized to extract some of the energy of the waves themselves, these devices are not able to extract energy from the moving water itself.

Prior art devices range from elongate cylinders or like structures bobbing at the surface of the body of water for driving a propeller carried thereby, through so-called air turbines which comprise floating bodies at the surface with open bottom chambers into which waves are permitted to rise and fall for alternately compressing air in chambers to drive a turbine, up to complex bodies specifically configured to obtain rotational movement from the action of waves and moving water particles thereon to drive turbines. These last devices are commonly referred to as Salter's Duck.

All such prior art devices capture or convert only a small portion of the available power in waves and in many cases are not durable enough to withstand the forces encountered in the ocean's waters or are not cost efficient.

Another device provides a structure which floats at the surface of a body of water and is constructed to convert the rolling or orbital motion of water particles in the waves into a linear flow of water and to then accelerate the linear flow without using any mechanical means or process. The accelerated flow is then utilized, inter alia, to drive a water wheel, turbine or the like for extracting power from the moving body of water.

Another known a device for the conversion of the energy of the gravitational waves, i.e. sea and ocean wind-formed waves, or dead or ground sea swell in which a series of input parallel converters are connected by means of an input collector manifold with a turbogenerator which on its turn is connected by means of an output collector-manifold to a series of parallel output converters which let out the water in the low part of the wave. In such devices, the input and output converters have independent sources of gas under pressure. The device is maintained at a given level by means of a ballast system fitted to the converters and stabilizers.

The disadvantage of this device is the large number of input and output elements which makes this device very complicated. Furthermore, the flow should surmount the local resistances in its inflow in the input and outflow from the output collector or manifold as a result of which there occurs a decrease in the harnessed energy.

Another shortcoming of such a known device is that the independent sources of gas under pressure maintain the water in the input and output converters and this can vary over a wide range. When the level is very low, part of the gas can flow out of the converters and this results in a loss of part of the compressed air. Conversely, when we have a high level and a little volume of the gas cushion, the latter is inferior in its role as buffer and energy accumulator.

Furthermore, this device cannot be directed at a specified angle towards the wave front, and in this way an important reserve for increasing its smoothness of operation and improving its efficiency cannot be utilized.

In the past, research performed on ocean thermodynamics revealed that energy costs would surpass energy production for the then known ocean wave producing energy systems. In one known system, a floating tank is provided with an opening at the top of the tank which leads into a passage extending through the center of the tank where a propeller-like blade is mounted.

The action of the ocean waves causes water to flow into the opening at the top of the tank where such water falls onto the blade to rotate it and consequently produce electrical energy. One limitation of this system is that it can utilize only the amount of ocean water that flows into the tank opening to provide the dynamic force on the propeller blade, rather than being able to use the full force of the ocean wave.

Generating technologies for deriving electrical power from the ocean include tidal power, wave power, ocean thermal energy conversion, ocean currents, ocean winds and salinity gradients. Of these, the three most well-developed technologies are tidal power, wave power and ocean thermal energy conversion.

Tidal power requires large tidal differences which, in the U.S., occur only in Maine and Alaska. Ocean thermal energy conversion is limited to tropical regions, such as Hawaii, and to a portion of the Atlantic coast. Wave energy has a more general application, with potential along the California coast. The western coastline has the highest wave potential in the U.S.; in California, the greatest potential is along the northern coast.

Wave energy conversion takes advantage of the ocean waves caused primarily by interaction of winds with the ocean surface. Wave energy is an irregular and oscillating low-frequency energy source that must be converted to a 60-Hertz frequency before it can be added to the electric utility grid.

Although many wave energy devices have been invented, only a small proportion have been tested and evaluated. Furthermore, only a few have been tested at sea, in ocean waves, rather than in artificial wave tanks.

As of the mid-1990s, there were more than 12 generic types of wave energy systems. Some systems extract energy from surface waves. Others extract energy from pressure fluctuations below the water surface or from the full wave. Some systems are fixed in position and let waves pass by them, while others follow the waves and move with them. Some systems concentrate and focus waves, which increases their height and their potential for conversion to electrical energy.

A wave energy converter may be placed in the ocean in various possible situations and locations. It may be floating or submerged completely in the sea offshore or it may be located on the shore or on the sea bed in relatively shallow water. A converter on the sea bed may be completely submerged, it may extend above the sea surface, or it may be a converter system placed on an offshore platform. Apart from wave-powered navigation buoys, however, most of the prototypes have been placed at or near the shore.

The visual impact of a wave energy conversion facility depends on the type of device as well as its distance from shore. In general, a floating buoy system or an offshore platform placed many kilometers from land is not likely to have much visual impact (nor will a submerged system). Onshore facilities and offshore platforms in shallow water could, however, change the visual landscape from one of natural scenery to industrial.

The incidence of wave power at deep ocean sites is three to eight times the wave power at adjacent coastal sites. The cost, however, of electricity transmission from deep ocean sites is prohibitively high. Wave power densities in California's coastal waters are sufficient to produce between seven and 17 megawatts (MW) per mile of coastline.

As of 1995, 685 kilowatts (kW) of grid-connected wave generating capacity is operating worldwide. This capacity comes from eight demonstration plants ranging in size from 350 kW to 20 kW. None of these plants are located in California, although economic feasibility studies have been performed for a 30 MW wave converter to be located at Half Moon Bay. Additional smaller projects have been discussed at Fort Bragg, San Francisco and Avila Beach. There are currently no firm plans to deploy any of these projects.

As of the mid-1990s, wave energy conversion was not commercially available in the United States. The technology was in the early stages of development and was not expected to be available within the near future due to limited research and lack of federal funding. Research and development efforts are being sponsored by government agencies in Europe and Scandinavia.

Many research and development goals remain to be accomplished, including cost reduction, efficiency and reliability improvements, identification of suitable sites in California, interconnection with the utility grid, better understanding of the impacts of the technology on marine life and the shoreline. Also essential is a demonstration of the ability of the equipment to survive the salinity and pressure environments of the ocean as well as weather effects over the life of the facility.

Wave energy could easily replace fossil fuel energy in some areas along coasts, cutting down on greenhouse gas emissions and the atmospheric pollution caused by burning fossil fuels. The effects on the environment are generally minor, as the construction of a wave energy plant requires about the same area as a small harbor.

Ocean waves are created by the interaction of winds with the surface of the sea. They contain large amounts of energy stored in the velocity of the water particles and in the height of the mass of seawater in a wave front above the mean level of the sea (E.S.B.I. and E.T.S.U., 1997).

The amount of wind energy that can be transferred to the surface of the ocean to create the waves depends upon the wind speed, the distance over which it interacts-known as the fetch- and the duration for which it blows over the water. Due to the direction of the prevailing winds and the size of the Atlantic Ocean, North Western Europe including Britain and Ireland have one of the largest wave energy resources in the world (E.S.B.I. and E.T.S.U., 1997).

There are significant differences in seasonal levels of wave energy, but the long term output should be somewhat more predictable than with some other renewable resources (E.S.B.I. and E.T.S.U., 1997).

The principal ways of extracting energy from waves rely either separately or jointly on the surge, heave and pitch of the waves. The frequency of arrival of ocean waves is low (a few per minute). As electrical generators rotate at hundreds of revolutions per minute the conversion mechanism must produce a higher frequency rotation to generate electricity-which is a convenient energy transfer medium. This can be done by hydraulic pumps or pneumatic bags/chambers driving higher speed turbines and generators.

Such conversion mechanisms have been tested by the construction of many varieties of experimental laboratory models and by some small-scale devices in the open sea or large lochs.

Currently there are two types of shoreline device in operation. One is a shoreline or caisson breakwater oscillating water column driving a pneumatic Wells turbine in 10 to 25 metres of water. The second type is a tapered channel device that was developed in Norway. In this type, incoming waves travel up a tapering channel, overflow and fill a higher level reservoir. The enclosed water then drives a Kaplan hydroelectric turbine as it returns to the sea.

A floating offshore device known as the circular clam has been developed by Sea Energy Associates and Coventry University, Britain. The design comprises a floating twelve-sided hollow ring. Each of the twelve sides has a flexible membrane that inflates and deflates with the incoming wave action. The air passes via a central circular manifold through Wells turbines, which drive electrical generators.

In the long term, wave conversion devices positioned in deep water offshore may provide the most likely method of large scale energy recovery. Development of shoreline and near shore systems is, however, relatively further advanced although considerable proving work remains to be done if these are to be considered as reliable sources of electricity (E.S.B.I. and E.T.S.U., 1997).

SUMMARY OF THE INVENTION

A wave energy conversion system converts wave energy within a wave medium into electrical energy. The wave energy conversion system includes a base substantially connected to a wave-medium floor, a tidal platform connected to the base and a tidal float connected to the tidal platform. An axle is connected to the tidal platform with an inductive coil positioned within the axle, such that an axis of the inductive coil is parallel to the axle. A magnetic sleeve includes a magnetic sleeve opening, such that the axle passes through the magnetic sleeve opening. A float member is connected to the magnetic sleeve. A wave moving through the wave causes displacement of the float member, causing the magnetic sleeve to move relative to the inductive coil and generate electrical energy within the inductive coil.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
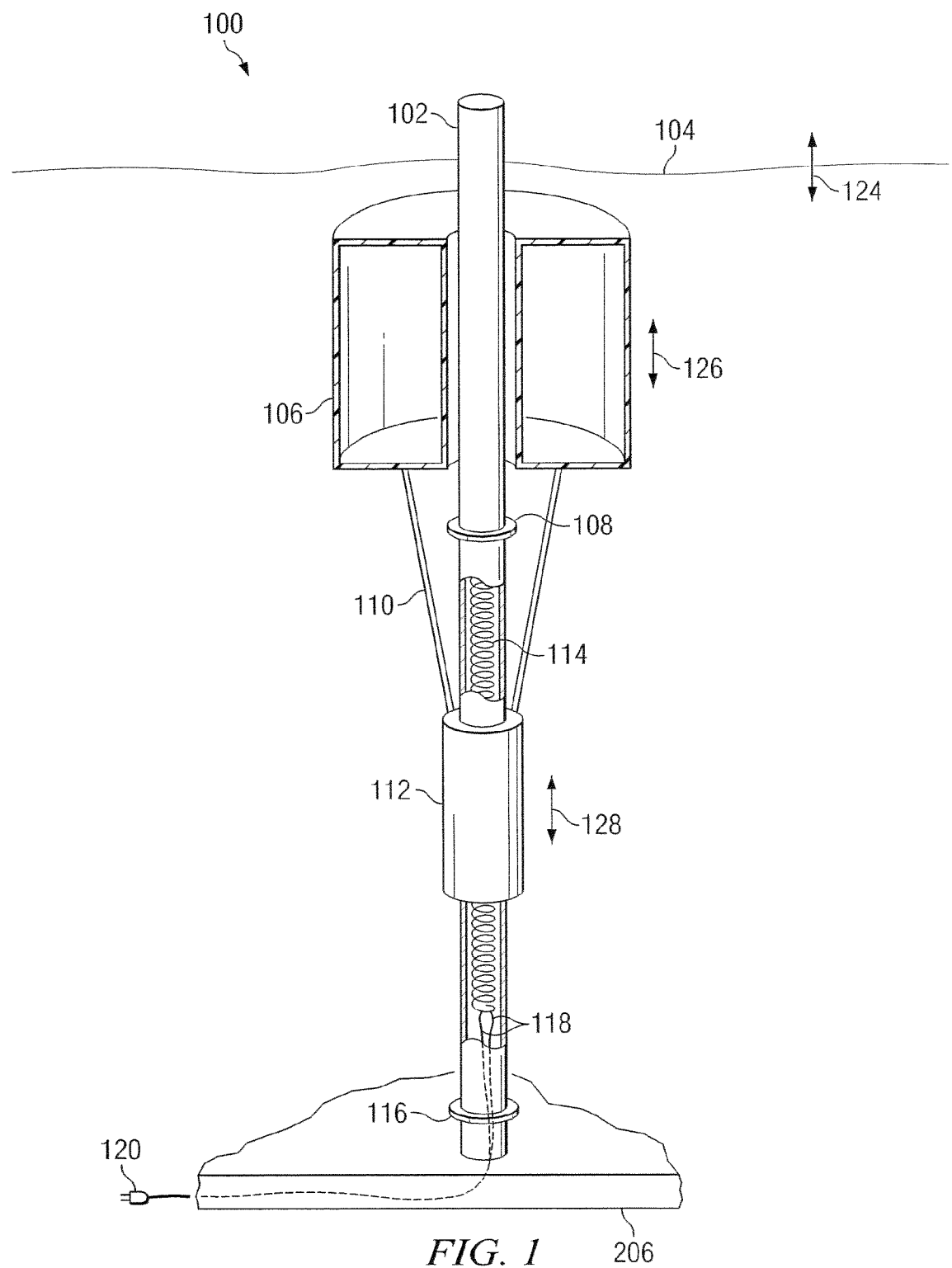
FIG. 1 illustrates a wave energy conversion device.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

With reference to FIG. 1, a wave energy conversion device 100 in accordance with the preferred embodiment is shown. The wave energy conversion device 100 includes a generally vertically positioned central wave displacement axle 102.

The central wave displacement axle 102, in accordance with the preferred embodiment, is a hollow rigid pole. The diameter of the central wave displacement axle will typically be about one inch, although the dimensions of the wave energy conversion device 100 and the central wave displacement axle will depend primarily on the depth of the wave-producing body of water and the intensity of the waves at the point of implementation.

The central wave displacement axle 102 may be formed of metal, plastic, composite materials or other substances. Typically, the material used to form the central wave displacement axle 102 should be sufficiently rigid to maintain its shape under the kinds of forces that may be present in subsurface wave action. Because the environment of a wave-producing body of water, particularly in the ocean with salt-rich sea-water, is particularly harsh, the choice of material will require consideration of several factors, including strength, weight and durability in the medium.

A buoyant collar float 106 is attached to an upper end portion of the central wave displacement axle 102. In accordance with the preferred embodiment, the buoyant collar is a cylindrical float with a hollow interior, such that the buoyant collar 106 may move along the central wave displacement axle 102 inserted through the hollow interior of the buoyant collar float 106.

The buoyant collar 106 may be designed to have a specific gravity less than the wave medium 104, such that the buoyant collar tends to rise when submerged in the wave medium 104 and float on the wave medium when not subjected to other pressures. Typically, the buoyant collar 106 is made from a substance that contains significant gas content, such as Styrofoam, or an elastic material like a balloon containing gas. The buoyant collar 106 may be configured as an inverted milk bucket with holes.

As the wave medium 104 moves, the buoyant collar 106 moves vertically on the central wave displacement axle 102 as the buoyant collar 106 is subjected to pressures from the moving wave medium 104.

The buoyant collar 106 may typically fashioned in a foam-filled container or a gas-filled container. A person having skill in the art will appreciate that the buoyant collar 106 may be fashioned in a variety of shapes and designs, as well as lending itself to being made from a variety of materials. Choice of the materials will depend on implementation details of the particular embodiment.

The buoyant collar 106 is attached by attachment lines 110 to a magnetic sleeve 112. In accordance with the preferred embodiment, the buoyant collar 106 is attached to the magnetic sleeve 112 by four attachment lines 110, each connected at the end points of perpendicular diameters of the magnetic sleeve 112.

The particular arrangement of the attachment lines 110 for a given embodiment will depend on the details of the implementation. The attachment lines 110 may be wires, rods, cords, string, line or any other medium capable of attaching the buoyant collar 106 to the magnetic sleeve 112.

In accordance with one embodiment, the attachment lines 110 are made from a stiff material, such as aluminum or steel, such that when the buoyant collar 106 descends along the central wave displacement axle 102, the magnetic sleeve 112 is pushed down by the attachment lines 110.

Flexible materials such as cord or line may be used for the attachment lines 110, as the weight of the magnetic collar tends to cause the magnetic collar 112 to descend along the central wave displacement axle 102.

Magnetic sleeve 112, in accordance with the preferred embodiment, is a hollowed cylinder made from a magnetic substance, such as magnetized iron. Typically, the magnetic substance will be a ferromagnetic alloy, although other magnetic materials may be used as appropriate or desirable.

The magnetic substance may be covered with a plastic or other covering to protect the magnetic substance from the wave medium 104. The interior diameter of the magnetic sleeve 112 is typically larger than the exterior diameter of the central wave displacement axle 102, such that the magnetic sleeve 112 may move freely over the length of the central wave displacement axle 102 inserted through the magnetic sleeve 112. Ball bearings or other forms of lubricative mechanism may be implemented between the magnetic sleeve 112 and the central wave displacement axle 102.

Within a hollow portion of the central wave displacement axle 102 is an inductive coil 114 of electrically conductive wire. The inductive coil 114 may extend through the hollow portion of the central wave displacement axle 102 from the lower limit of the magnetic sleeve's motion 116 and the upper limit of the magnetic sleeve's motion 108.

An inductive coil 114, typically less than the length of the full range of motion of the magnetic sleeve 112, may be used. An inductive coil 114 more than the length of the full range of motion of the magnetic sleeve 112 may be used.

The type of electrically conductive wire and dimensions of the inductive coil 114 are determined by the embodiment. In another embodiment, the inductive coil 114 may be embedded in the material of the central wave displacement axle 102.

Where the central wave displacement axle 102 is made of metal, particularly conductive metal, the electrically conductive wire forming the inductive coil 114 is insulated from conductive contact with the central wave displacement axle 102. The inductive coil 114 is electrically connected to transmission wires 118. The transmission wires 118 provide current to a connector 120.

The motion of the magnetic sleeve 112 along the central wave displacement axle 102 is limited at one end by an upper axle collar 108 and at the other end by a lower axle collar 116. The upper axle collar 108 and the lower axle collar 116 are typically formed by an expanded portion of the central wave displacement axle 102. Other forms of motion limiting may be used, as appropriate to the central wave displacement axle 102 and the magnetic sleeve 112.

As the magnetic sleeve 112 passes along the surface of the central wave displacement axle 102 with the inductive coil 114 positioned within the central wave displacement axle 102, electric current is generated in the inductive coil 114 by induction. The magnetic field of the magnetic sleeve 112 moves through the inductive coil 114, creating an electromagnetic field in the inductive coil 114, resulting in a voltage differential and an electrical current, through the wire.

The magnitudes of the voltage differential and electrical current created is determined by the magnetic qualities of the magnetic sleeve 112, the details of the inductive coil 114 and the length and speed of the vertical displacement of the magnetic sleeve 112 along the central wave displacement axle 102.

As the wave medium 104, typically seawater at or near an ocean shore, undulates in depth, the vertical wave motion 124 creates vertical axle motion 126 in the buoyant collar 106. The attachment of the buoyant collar 106 to the magnetic sleeve translates the vertical axle motion 126 of the buoyant collar to vertical sleeve motion 128.

The vertical sleeve motion 128 causes the magnetic sleeve 112 to move along the axis of the inductive coil 114 within the central wave displacement axle 102, generating electrical current in the inductive coil 114. The electrical energy generated passes through the transmission wire 118 to output circuits. The generated electrical energy available at the output interface 120 is fed to an electrical output circuit that captures, stores or otherwise uses the electrical current.

Buoyant collar float 106 comprises a buoyant member, typically designed to provide variable buoyancy under the surface of the body of liquid 104. The buoyant collar float 106 may contain a constant mass of gas, the volume of which is dependent on the pressure exerted by the body of wave-medium 104. A varying pressure will result in a change in volume of the gas, a change in volume of the elastic member and a resultant change in buoyancy of the buoyant collar float 106.

In accordance with one embodiment, buoyant collar float 106 may be a balloon type structure, made of, or partly made of, elastic or otherwise flexible material that may change in shape and size according to the pressure exerted on the gas contained therein.

In accordance with one embodiment, the balloon-type buoyant collar float 106 may be held in a net cage and shaped so as to maximize the point effect, i.e. minimize the diameter of the buoyant collar float 106 with respect to the wavelength of the over-passing wave in the wave-medium 104, from the prevailing wave climate.

Central wave displacement axle 102 is connected at the bottom to a horizontal stabilization platform base 206. The connection of the central wave displacement axle 102 and the horizontal stabilization platform base 206 may be a solid connection, such as a weld, or a pivoted connection, to allow the central wave displacement axle to move relative to the horizontal stabilization platform base 206.

In the shown embodiment, the horizontal stabilization platform base 206 is hollow to allow transmission wires 118 to be placed therein. The horizontal stabilization platform base 206 may be a pipe, a solid plate, a hollowed plate, a grid of pipes or any other configuration suitable for holding one or more wave energy conversion devices 100.

Figure 2:
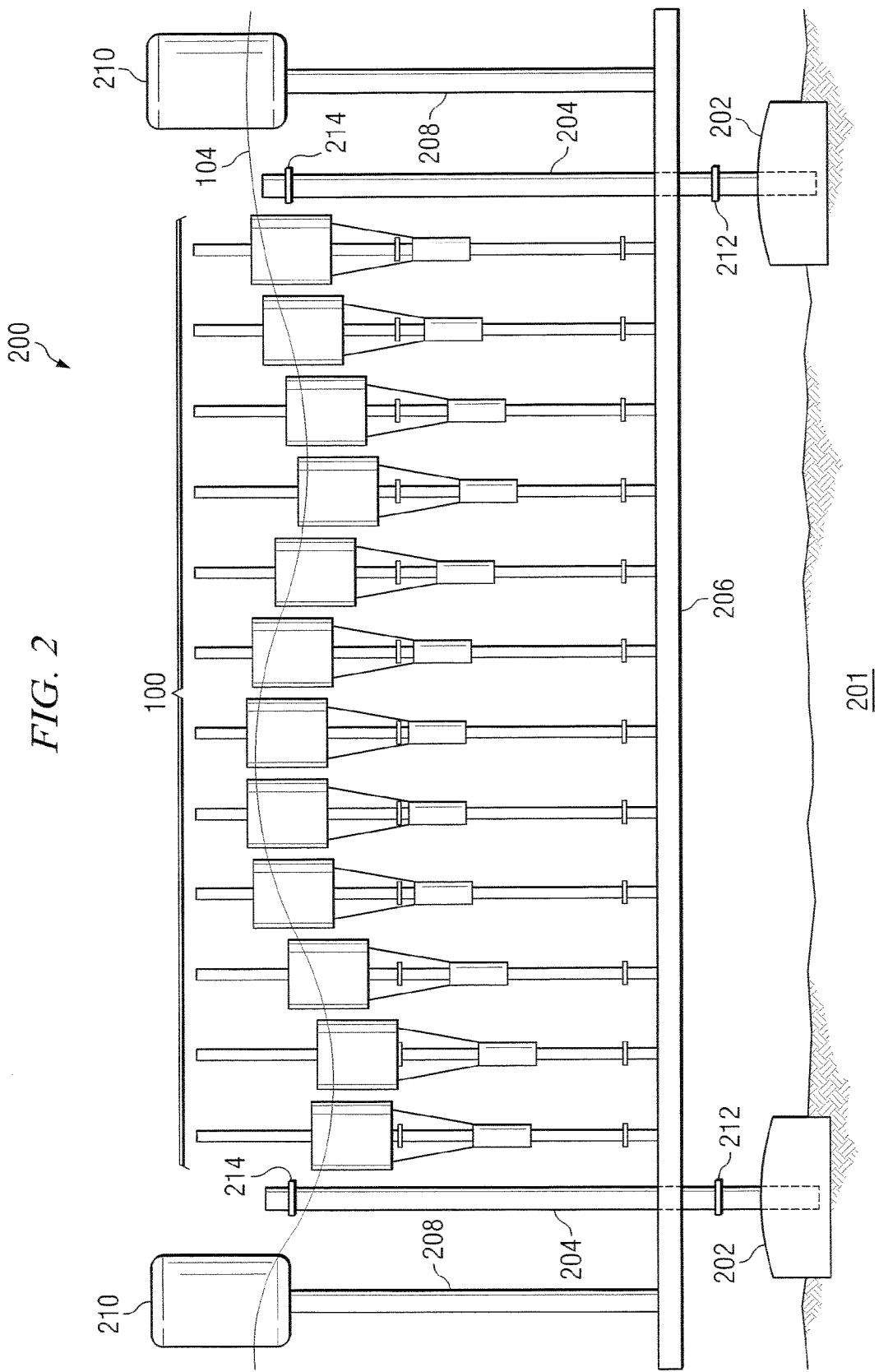
FIG. 2 illustrates a wave energy conversion system.

With reference to FIG. 2, a wave energy conversion system 200 is shown. The wave energy conversion system 200 is submerged in wave medium 104, typically the ocean at or near the shore. In accordance with the preferred embodiment, the wave energy conversion system 200 is anchored to the ocean floor 201 using anchors 202. Anchors 202 would typically be made from concrete or similar compounds. It may be advantageous to use other anchoring devices or systems to anchor the wave energy conversion system 200 to the ocean floor 201.

In other embodiments, with a floating horizontal stabilization platform base, the wave energy conversion system 200 may not be anchored to the ocean floor 201. In this embodiment, the wave energy conversion system 200 would be attached to floats. The floating wave energy conversion system embodiment would be necessary where the wave energy conversion system 200 is used in a deep sea environment, where anchoring to the ocean floor 201 is impractical.

In the preferred embodiment, the anchors 202 are attached to seabed stabilization posts 204. The seabed stabilization posts 204 are typically embedded in concrete forming the anchors 202, such that the concrete solidifies on the seabed stabilization posts to form a generally heavy and un-detachable anchor 202. In accordance with the preferred embodiment, the seabed stabilization posts 204 are positioned vertically. In other embodiments, the seabed stabilization posts 204 may be positioned at another angle.

Seabed stabilization posts 204 act as a motion guide for horizontal stabilization platform horizontal stabilization platform base 206. Seabed stabilization posts 204 extend through a hole or indentation in the horizontal stabilization platform base 206, such that horizontal stabilization platform base 206 may rise or fall vertically along the seabed stabilization posts 204.

The horizontal stabilization platform base 206 is typically a planar surface. Horizontal stabilization platform base 206 may be formed of a solid plate of a wave-medium-resistant material. A base may typically be formed of steel, aluminum, plastic, or any other appropriate substance. Horizontal stabilization platform base 206 may be formed as a mesh or as a multi-orifice surface.

The vertical motion of the horizontal stabilization platform base 206 along the seabed stabilization posts 204 is typically limited by a lower collar 212 and an upper collar 214. The lower collar 212 and the upper collar 214 may be integral with the seabed stabilization posts 204, or may be created by adding a piece to the seabed stabilization post 204, such that the piece limits the motion of the horizontal stabilization platform base 206.

As shown, horizontal stabilization platform base 206 is connected at the extremity to tidal displacement corner posts 208. In the preferred embodiment, horizontal stabilization platform base 206 is formed as a square, with tidal displacement corner posts 208 situated at the corners of horizontal stabilization platform base 206. It will be apparent to those having skill in the art that other configurations of tidal displacement corner posts 208 could be used, particularly in other configurations for the base shape.

Tidal displacement corner posts 208 are connected to tidal displacement floats 210. The tidal displacement floats 210 are typically attached to the tidal displacement corner posts 208 by a connection device such as rope, or may be fastened in any other appropriate manner.

The tidal displacement floats 210 are sufficiently buoyant to respond to changes in the wave medium depth by raising or lowering the horizontal stabilization platform base 206. The weight of the horizontal stabilization platform base 206, the tidal displacement corner posts 208 and the wave energy conversion devices 100 is sufficiently to keep the horizontal stabilization platform base 206 generally stable, adjusting to the tidal changes in the wave-medium 104 rather than the wave motion.

Wave energy conversion devices 100 are attached vertically to the base 206. In accordance with the preferred embodiment, the wave energy conversion devices 100 are positioned in an array over the surface of the base 206. The wave energy conversion devices 100 can be arranged as densely as free motion permits.

Figure 3:
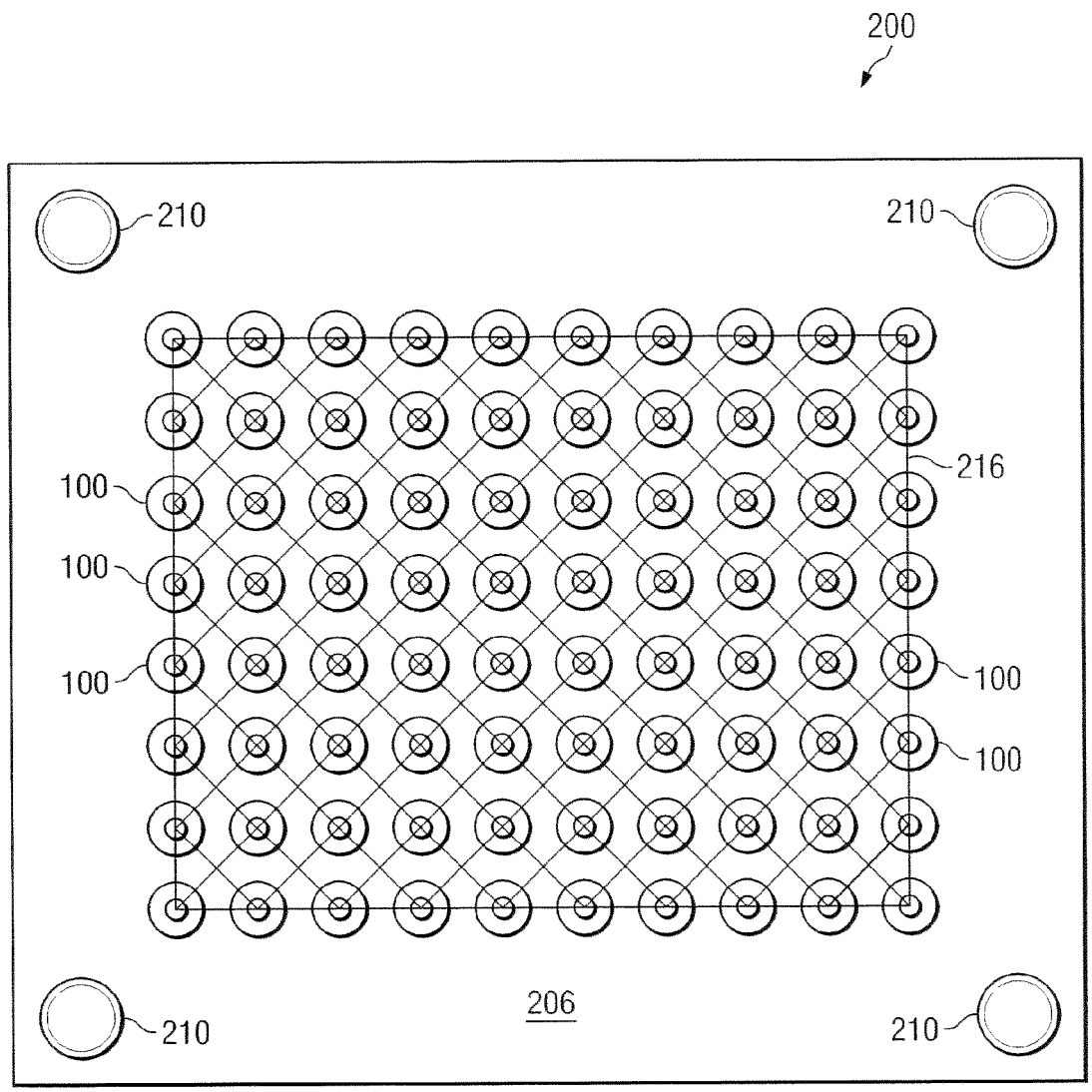
FIG. 3 illustrates an overhead view of a wave energy conversion system.

With reference to FIG. 3, an overhead view of wave energy conversion system 200 in accordance with the preferred embodiment is shown. This embodiment uses a rectangular horizontal stabilization platform base 206 with an array of wave energy conversion devices 100 attached to the upper surface of the horizontal stabilization platform base 206.

The wave energy conversion devices 100 may be attached to some or all of the adjoining wave energy conversion devices 100 in the array using connection lines 216. The connection lines 216 may be nylon line or some other form of cord. The interconnection of wave energy conversion devices 100 using the connection lines 216 restrict the non-vertical motion of the wave energy conversion devices 100, reducing the tendency of the wave energy conversion devices 100 to shift from their vertical position due to the repetitive forces of the waves. In this embodiment, four tidal displacement floats 210 are situated at the corners of the horizontal stabilization platform base 206. In another embodiment, the wave energy conversion devices 100 are not connected using connection lines 216.

Figure 4:
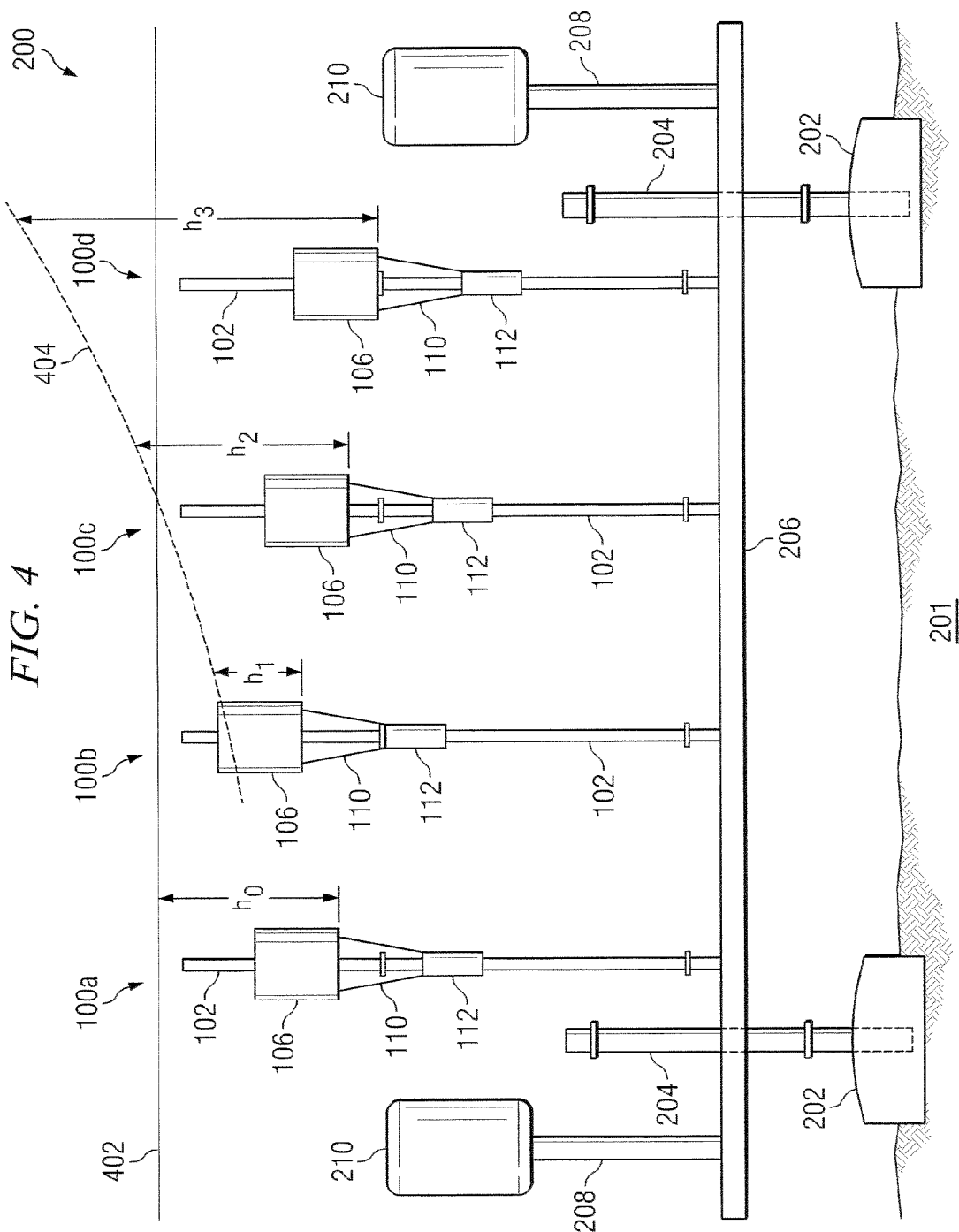
FIG. 4 illustrates a wave energy conversion system.

With reference to FIG. 4, a simplified wave energy conversion system 200 is shown. A median wave-medium level is shown by line 402. The first wave energy conversion device 100a is shown at a reference position, such that the distance between the buoyant collar float 106 and the median level 402 is at a determined height $h_0$. A wave in the wave-medium is shown at line 404, such that the depth of the water is lower than the median wave-medium level above a second wave-energy conversion device 100b and the depth of the water is higher above a fourth wave-energy conversion device 100d.

With reference to the second wave energy conversion device 100b, the depth of the water above the buoyant collar float 106 is $h_1$, where $h_1$ is less than $h_0$. Because the water above the buoyant collar float 106 of the second wave energy conversion device 100*b* weighs less than the water above the buoyant collar float 106 of the first wave energy conversion device 100*a*, the buoyant collar float 106 of the second wave energy conversion device 100*b* rises. The buoyancy of the buoyant collar float 106 is greater than the weight of the water at a depth of $h_1$.

With reference to the fourth wave energy conversion device 100*d*, the depth of the water above the buoyant collar float 106 is $h_3$, where $h_3$ is greater than $h_0$. Because the water above the buoyant collar float 106 of the fourth wave energy conversion device 100*d* weighs more than the water above the buoyant collar float 106 of the first wave energy conversion device 100*d*, the buoyant collar float 106 of the fourth wave energy conversion device 100*d* sinks. The buoyancy of the buoyant collar float 106 is less than the weight of the water at a depth of $h_3$.

When the surface of the wave medium 104 is not flat as in 404, it is equivalent to the occurrence of waves on a water surface. The wave energy conversion device 100*d* is under a crest of a wave 404. As a result, the height of water column $h_3$ is greater than $h_0$. The effect of this is the exertion of more pressure on the quantity of gas. According to Boyle's Law pressure times volume (PV) is constant for constant temperature or, under conditions that will most probably favour adiabatic change, $PV^\gamma$ is constant where gamma tends towards 1.4 for air. Hence, as the pressure has increased, the volume of gas within the buoyant collar float 106 contracts.

The height $h_3$ is equivalent to the height of the wave crest plus any downward movement of the buoyant collar float 106. Both components of $h_3$ act so as to increase the pressure on the elastic member 106 and cause a reduction in volume of the elastic member. According to Archimedes' Principle, as the volume of the elastic member 106 decreases and less liquid is displaced, the upthrust corresponding to the mass of water displaced will be lessened.

Wave energy conversion device 100*b* is under a trough of a wave 404. The height $h_1$ is less than $h_0$, such that less pressure is being exerted on the gas, with a resultant increase in the volume of the elastic member 106. In a similar manner to that described with relation to wave energy conversion device 100*c*, $h_1$ is made up of two components; the depth of the trough and the upward movement of the buoyant collar 106.

The movement of the buoyant collar float 106, which results from using a flexible balloon type arrangement, under the crest and trough adds a dynamic effect to the static effect caused by the passage of the passing wave 404.

Figure 5:
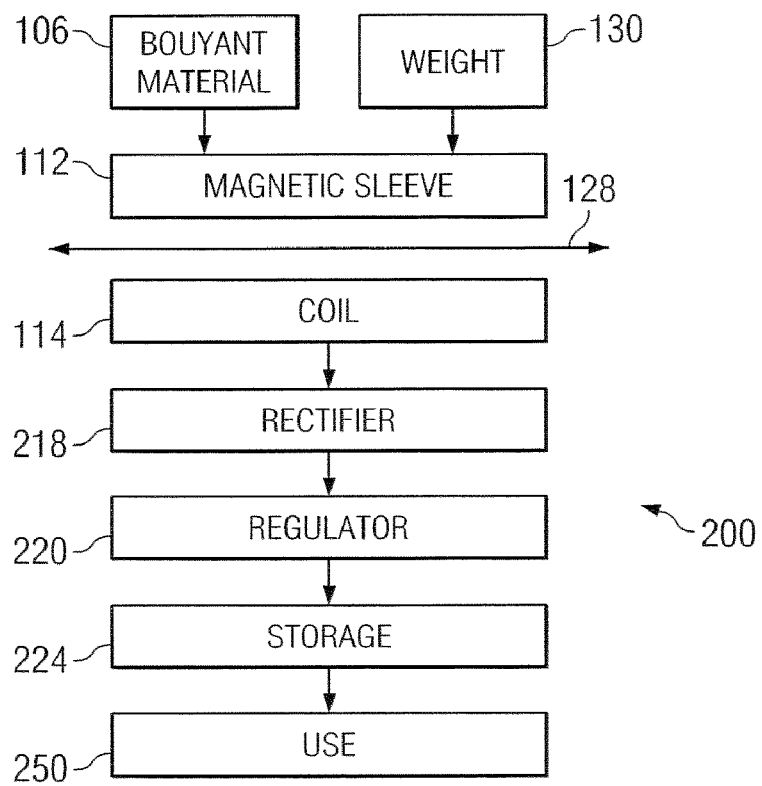
FIG. 5 illustrates a functional block diagram of a wave energy conversion system.

With reference to FIG. 5, a functional block diagram of the wave-energy conversion system 200 is shown. Electrical energy is generated by the relative motion 128 between the magnetic sleeve 112 and the coil 114. The magnetic sleeve 112 is moved in attachment to a combination of buoyant material 106 and weight 130.

The buoyant material 106 tends to cause the magnetic sleeve 112 to rise, while the weight 130 (including the weight of the magnetic sleeve 112) causes the magnetic sleeve 112 to sink. Changes in depth of the wave-medium causes the magnetic sleeve 112 to rise and fall relative to the coil 114 as the forces on the buoyant material 106 and the weight 130 are unbalanced.

The coil 114 is electrically connected to at least an output 250. The circuitry and other devices positioned electrically between the coil 114 and the output 250 may vary. Typically, the output of the coil will go to a rectifier 218, which creates a positive flow of electricity from the random positive and negative flow generated by the random movements of the magnetic sleeve 112 relative to the coil 114.

Similarly, a regulator 220 may be connected to the output of the rectifier 218, to regulate the fluctuations in current output. For most uses, the output of the regulator 220 will be connected to a storage device 224, such as a battery. Stored in a storage device 224, the electrical energy may be used by any type of electrical device 250.

Figure 6:
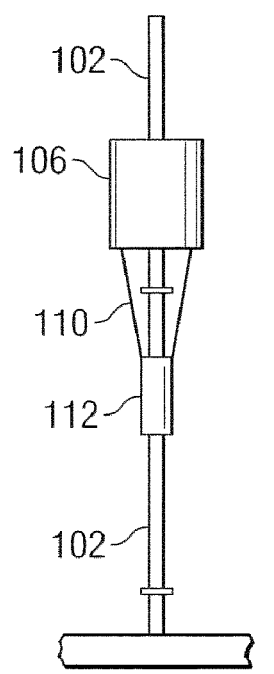
FIG. 6 illustrates a head element of a wave energy conversion device.

With reference to FIG. 6, a head assembly of the wave energy conversion device 100 is shown. In accordance with the preferred embodiment, the magnetic sleeve 112 has a diameter sufficient to generate electrical current in the coil 114. Relative to the buoyant forces applied by buoyant collar float 106, the magnetic sleeve 112 has little weight.

Figure 7:
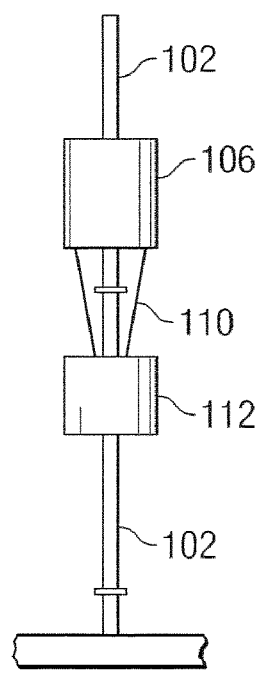
FIG. 7 illustrates a head element of a wave energy conversion device.

With reference to FIG. 7, a head assembly of the wave energy conversion device 100 in accordance with another embodiment is shown. In this embodiment, the magnetic sleeve 112 has a substantially large diameter than in the embodiment shown in FIG. 6. Relative to the buoyant forces applied by buoyant collar float 106, the magnetic sleeve 112 of this embodiment has a weigh approximately equal to the buoyant forces of the buoyant collar float 106. This embodiment may be useful in situations where the wave energy has a longer frequency.

Figure 8:
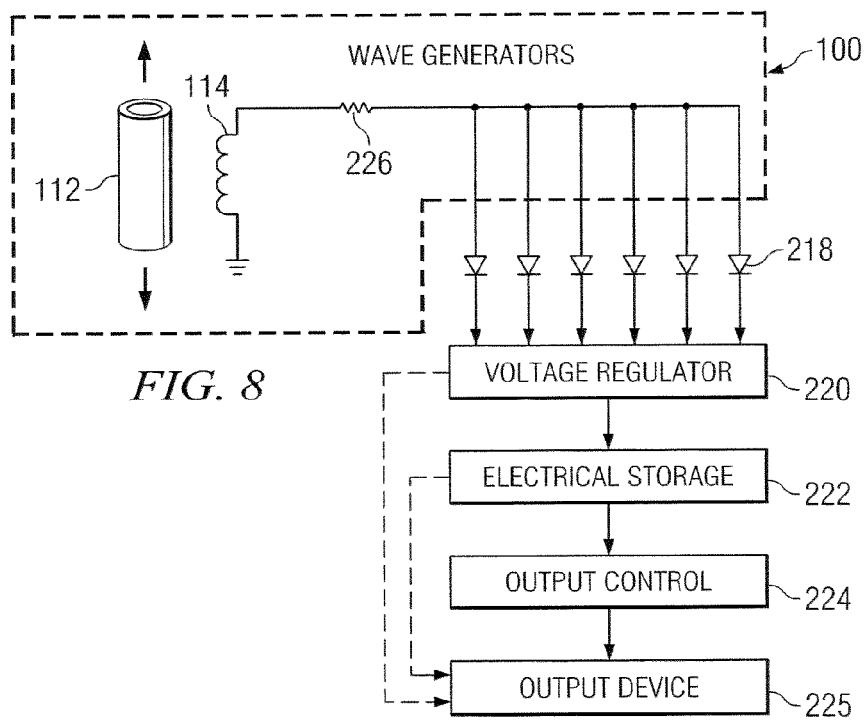
FIG. 8 illustrates a functional block diagram of an output system.

With reference to FIG. 8, a function block diagram of the output portion of a wave energy conversion system 200 is shown. The circuit representation of the wave-energy conversion device 100 consists of a magnetic sleeve 112 and inductive sleeve 114 represented as a grounded inductor. Resistance in the coil is represented by resistor 226. Each wave-energy conversion device 100 in a wave-energy conversion system 200 may be represented by an equivalent circuit.

Motion of the magnetic sleeve 112 relative to the coil 114 generates a voltage across inductor 114. The voltages generated by each of the inductive coils 114 in a plurality of wave energy conversion devices 100 are each fed to a rectifier 218. In one embodiment, the rectifier may be a diode, passing only the positive voltages generated by the wave-energy conversion device 100.

Each of the plurality of rectifiers 218 outputs to a voltage regulator 220. The output voltage of the voltage regulator 220 may be fed into electrical storage 222, such as a battery or any other energy storage mechanism. In some embodiments, the output voltage of the voltage regulator 220 may be provided directly to an output control 224 or to an output device 225.

The electrical storage 222 may be connected to an output control 224, for controlling the use of the output energy. The output of the electrical storage 222 may be connected directly to an output device 225. The output control 224 may be connected to an output device 225.

Figure 9:
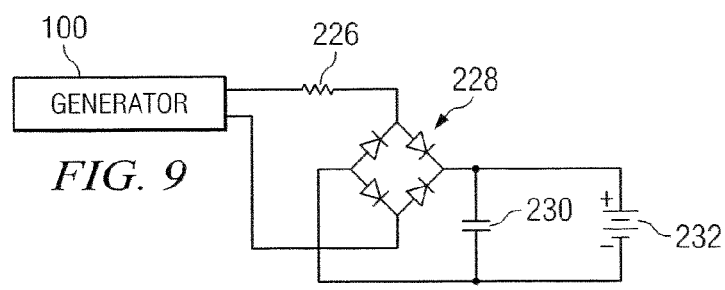
FIG. 9 illustrates a circuit diagram of an output system.
Figure 10:
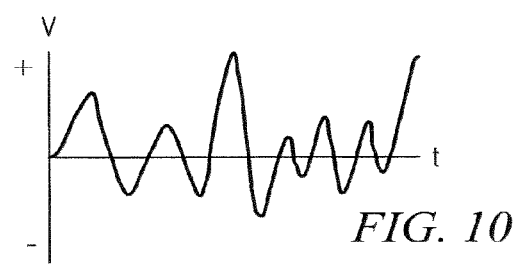
FIG. 10 illustrates a voltage output of a wave energy conversion device.

With reference to FIG. 9, a circuit for the output portion of a wave energy conversion system 200 in accordance with one embodiment is shown. The wave energy conversion device 100 outputs a voltage with both positive and negative voltage components, as shown in the graph of FIG. 10. The output voltage of the wave-energy conversion device 100 is connected across a resistance 226 and the inputs of a rectifier 228.

The arrangement of diodes in the rectifier 228 provides alternating paths for positive and negative voltages, such that the output of the rectifier 228 is only positive voltages. The output of the rectifier 228 is shunted by a capacitor 230 and across the terminals of a storage battery 232. The electrical energy produced by the wave energy conversion device 100 is thereby stored in the storage battery 232.

With reference to FIG. 10, a graph of a possible voltage output by a wave energy conversion device 100 is shown. The vertical axis of the graph represents the voltage differential between the outputs of the inductance coil 114. A reference line represents a zero voltage, with positive voltages represented above the reference line and negative voltages below the reference line. The horizontal axis represents time.

Movement of the magnetic sleeve 112 relative to the inductance coil 114 creates voltage at the output of the inductance coil 114, such that movement in one direction generates a positive voltage and movement in the opposite direction generates a negative voltage. The polarity of the inductance coil 114 will determine which direction of movement generates a positive voltage and which direction of movement generates a negative voltage.

Because the forces generated by wave motion, particularly in coastal regions where the average wavelength of the waves in the ocean are very short, are highly chaotic and random, the voltage changes between positive and negative in rapid and relatively unpredictable fashion. The speed of the magnetic sleeve 112 as it moves past the inductance coil 112 determines the value of the voltage, such that a magnetic sleeve 112 moving at a rapid speed past the inductance coil 112 generates a larger voltage than the same magnetic sleeve 112 moving at a slower speed past the inductance coil 112.

The depicted graph represents one possible voltage output, but it should be understood that the voltage output graphs may vary greatly, depending on the embodiment and the nature of the waves provided.

Figure 11:
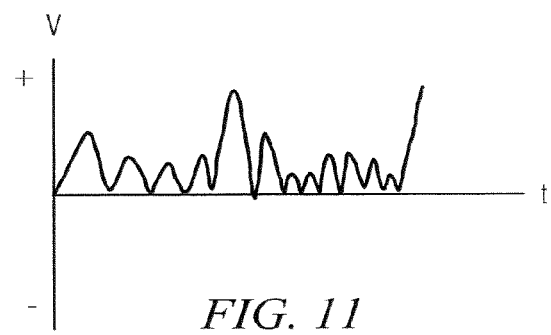
FIG. 11 illustrates a rectified voltage output of a wave-energy conversion device.

With reference to FIG. 11, a graph of the same voltage output by a wave energy conversion device 100 as shown in FIG. 10, at the output of rectifier 228 as shown in FIG. 9. The vertical axis of the graph represents the voltage differential between the outputs of the rectifier 228. A reference line represents a zero voltage, with positive voltages represented above the reference line and negative voltages below the reference line. The horizontal axis represents time. By the configuration of single-directional paths, as embodied in the diodes of the rectifier 228, the polarity of the voltage differences are aligned such that all voltage differences are output as positive voltages.

Figure 12:
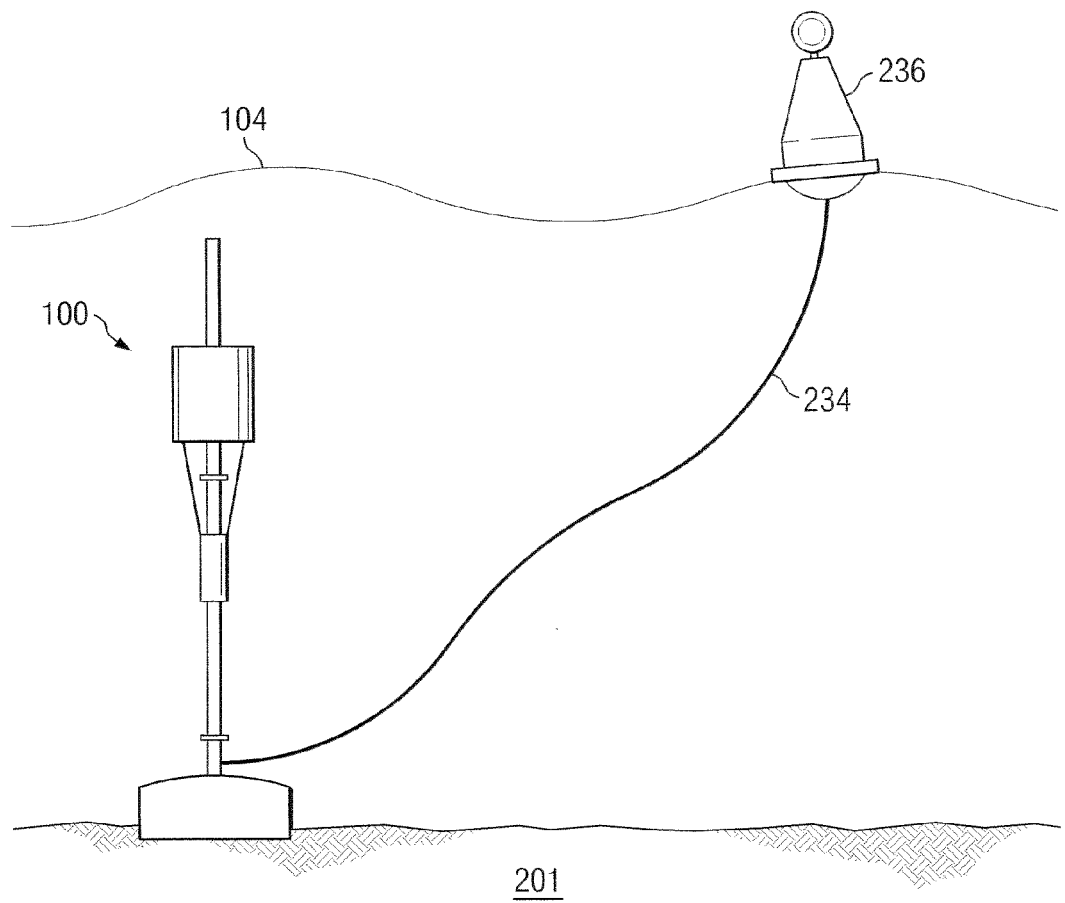
FIG. 12 illustrates a wave-energy conversion device use.

With reference to FIG. 12, a single wave-energy conversion device 100 use is shown. In this embodiment, a single wave-energy conversion device 100 is anchored to the sea-bed. Waves in the wave medium 104 cause the wave-energy conversion device 100 to output voltage. Typically, this output voltage is transferred to electrical storage 222. The energy is transmitted by wire 234 to an output device 236, such as a light, transmitter or other electrical device.

In the embodiment shown, the output device 236 is a light on a buoy. The low power requirements of a simple device like a lamp make it feasible to power the device with one or a few wave-energy conversion devices. The output device 236 may be a transmitter for use in a location system. As shown, without compensation for tidal effects, the wave-energy conversion device 100 may only provide power during high tide, or may provide significantly different levels of power at different times of the day, depending on the tide. Deeper water reduces the wave forces impacting the wave-energy conversion device.

Figure 13:
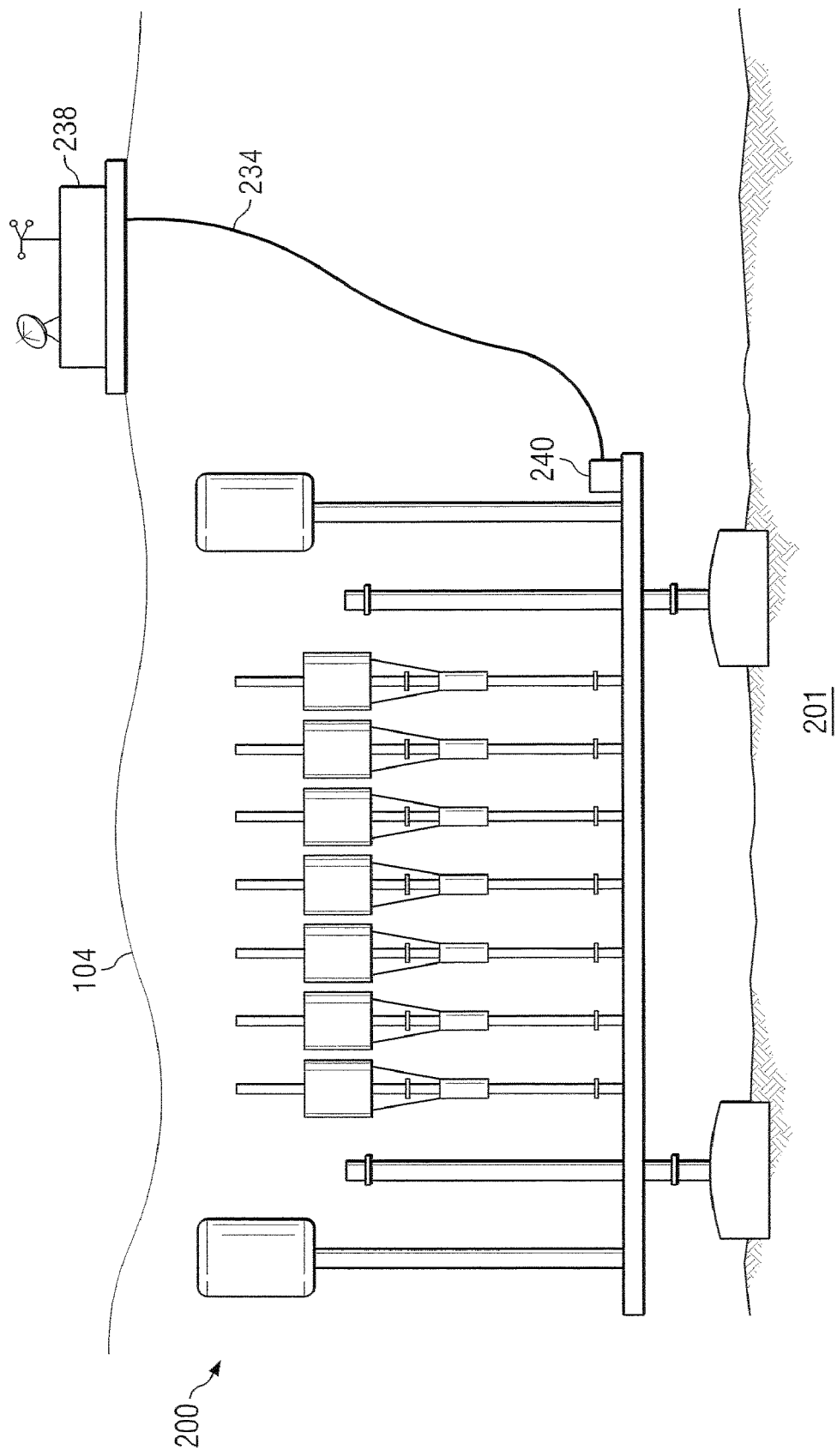
FIG. 13 illustrates a wave-energy conversion system use.

With reference to FIG. 13, a wave-energy conversion system 200 use is shown. The wave-energy conversion system 200 is anchored to the ocean floor 201. Waves in the wave medium 104 generate electrical power in the wave energy conversion devices 100 of wave energy conversion system 200.

The electrical energy generated by the wave energy conversion system 200 is provided to output 240 which may rectify, regulate, store and otherwise control the energy for output. The output 240 is electrically connected to transmission wire 234. In the present embodiment, the output electrical energy is provided to electrical equipment 238. The electrical equipment 238 may be a transmitter, sensing devices, receiver, exploration and operation equipment.

Because the wave-energy conversion system 200 as shown includes tidal compensation, the wave-energy conversion system 200 would provide fairly consistent energy outputs through the entire tidal cycle. This may be particularly advantageous where the electrical equipment 238 requires a steady supply of energy.

Figure 14:
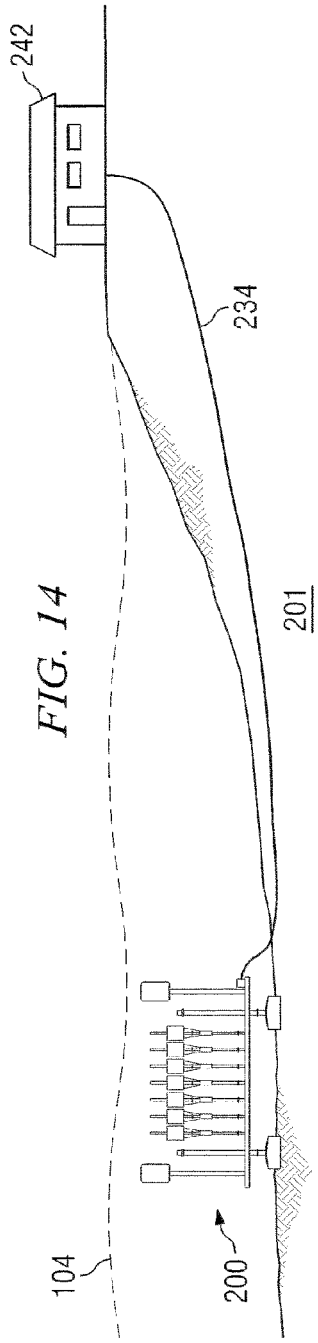
FIG. 14 illustrates a wave-energy conversion system use.

With reference to FIG. 14, a wave-energy conversion system 200 use in accordance with another embodiment is shown. The wave-energy conversion system 200 is anchored to the ocean floor 201. Waves in the wave medium 104 generate electrical energy in the wave-energy conversion devices 100 of the wave energy conversion system 200.

The electrical energy is output from the wave-energy conversion system via transmission wires 234 to shore output devices 242. The transmission wire 234 may be an underground cable, a cable through the wave-medium or other forms of energy transmission suitable for transmitting energy from the wave-medium to the shore. The shore output devices 242 may be connected to more than one wave-energy conversion system 200, to collect greater amounts of energy for use.

Figure 15:
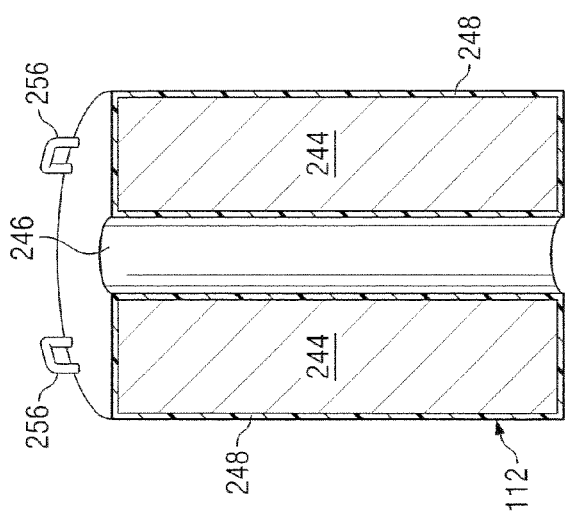
FIG. 15 illustrates a side cutaway view of a magnetic sleeve.

With reference to FIG. 15, a cutaway side view of a magnetic sleeve 112 in accordance with one embodiment is shown. Magnetic sleeve 112 includes a magnetized core section 244 and a insulation layer 248. The magnetic sleeve 112 is fashioned as a hollow cylinder, with a cylindrical passage 246 passing through the magnetic sleeve 112. The cylindrical passage 246 is sized appropriately to allow free passage of the central wave displacement axle 102 through the magnetic sleeve 112. Attachment hooks 256 are arranged on the upper end of the magnetic sleeve 112, for attachment of the magnetic sleeve 112 to the attachment lines 110.

Magnetized core section 244 may be made from a variety of magnetic materials. The choice of magnetic materials may depend on the qualities of the magnetic materials in consideration with the details of the specific embodiment implemented. Possible magnetic materials may include Ferrite magnets, NdFeB magnets, flexible magnets, injection bonded magnets, SmCo magnets, Alnico magnets or other types of magnetic material. In accordance with the preferred embodiment, insulated ferrite magnets are advantageous in this regard.

Insulation layer 248 is typically used to prevent corrosion of the magnetic core section 224 by the wave medium 104. Insulation layer 248 may also be used to provide electrical insulation, as necessary. Typically, a flexible plastic layer will be used as insulation, although the materials chosen may reflect the nature of the wave medium, the material of the magnetic core section 224 and the nature of the insulation required.

Figure 16:
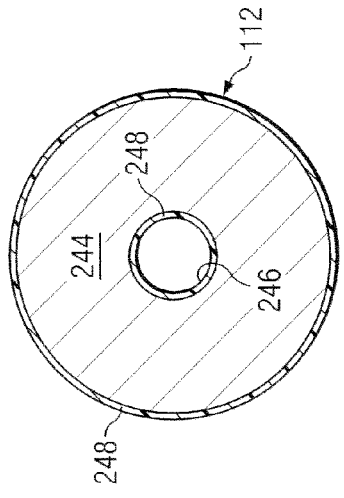
FIG. 16 illustrates a top cutaway view of a magnetic sleeve.

With reference to FIG. 16, a cutaway top view of a magnetic sleeve 112 is shown. This view shows the circular portion of the cylindrical shape of magnetic sleeve 112. The magnetic core section 244 is encased in insulating layer 248. All of the outer surfaces of the magnetic sleeve 112 are insulated, in accordance with one embodiment. The diameter of the cylindrical passage is preferably larger than the diameter of the central wave displacement axle 102. The insulation layer 248 provides physical and electrical insulation.

Figure 17:
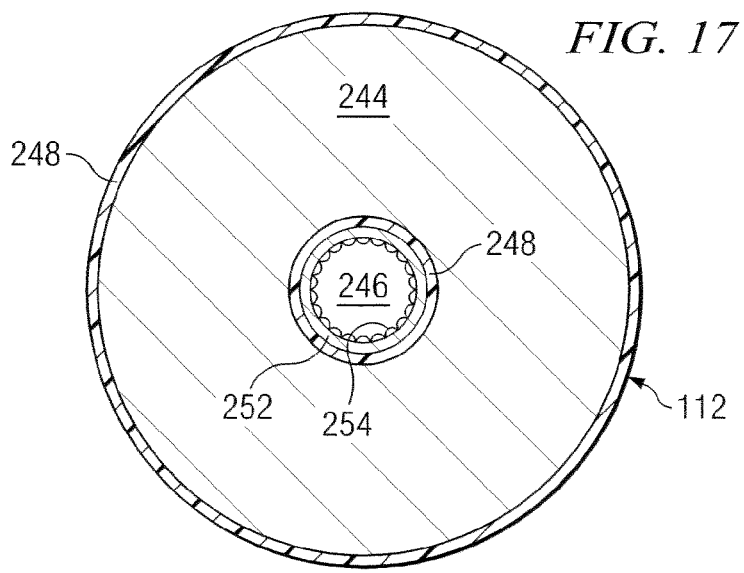
FIG. 17 illustrates a top cutaway view of a magnetic sleeve with a bearing device.

With reference to FIG. 17, a cutaway top view of a magnetic sleeve 112 with a bearing device 252 is shown. Because the generation of electrical energy by the wave-energy conversion device depends on the motion of the magnetic sleeve 112 over the surface of the central wave displacement axle 102. Depending on the environment where the wave-energy conversion device is deployed, the friction between the magnetic sleeve 112 and the central wave displacement axle 102 may exceed the specifications required to generate energy.

Any of a variety of friction reducing substances or mechanisms may be used to reduce the friction between the magnetic sleeve 112 and the central wave displacement axle 102. In the shown embodiment, a bearing device 252 is shown as attached to the exterior of the magnetic sleeve 112 within the cylindrical passage 246. Bearings 254 rotate with the relative motion of the magnetic sleeve 112 and the central wave displacement axle 102, thereby reducing the friction between them.

Figure 18:
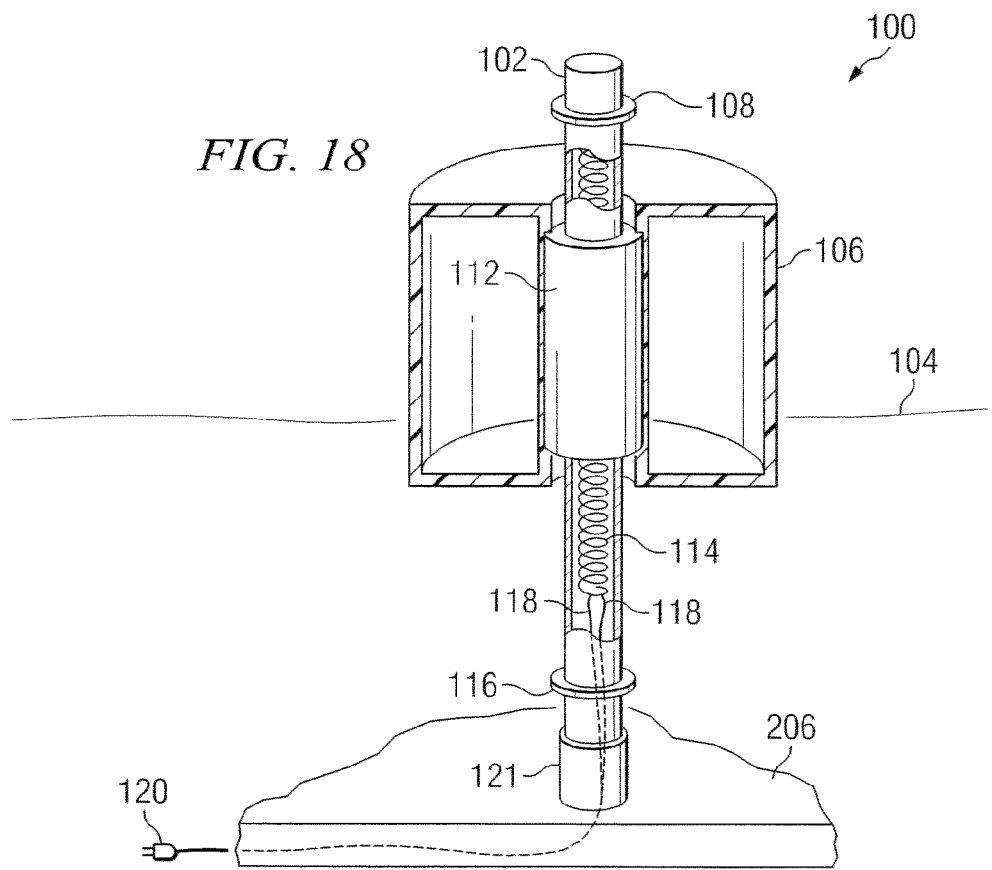
FIG. 18 illustrates a wave energy conversion device.

With reference to FIG. 18, a wave energy conversion device 100 in accordance with another embodiment is shown. In this embodiment, the magnetic sleeve 112 is placed within the buoyant collar float 106, such that the movement of the buoyant collar float 106 relative to the central wave displacement axle 102 is translated into motion of the magnetic sleeve 112.

In accordance with one embodiment, the connection of central wave displacement axle 102 to the horizontal stabilization platform base 206 may include a flexible connection 121. Flexible connection 121 may typically include rubber or a similar flexible material. In accordance with the preferred embodiment, the flexible connection 121 permits the central wave displacement axle 102 a small range of motion relative to the horizontal stabilization platform base 206.

Figure 19:
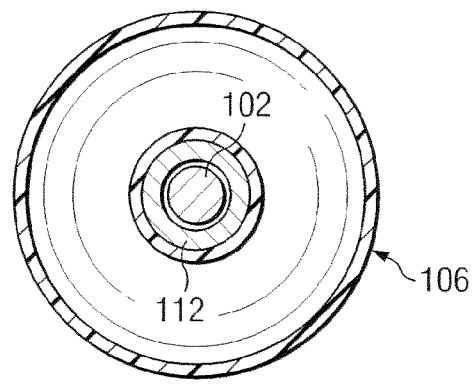
FIG. 19 illustrates a cutaway view of a wave energy conversion device.

With reference to FIG. 19, a cross-section of a wave energy conversion device 100 in accordance with the embodiment shown in FIG. 18. The cross section runs perpendicular to the axis of the central wave displacement axle 102. The buoyant collar float 106 is cylindrically shaped. The magnetic collar 112 is placed within the central opening of the buoyant collar float 106.

Figure 20:
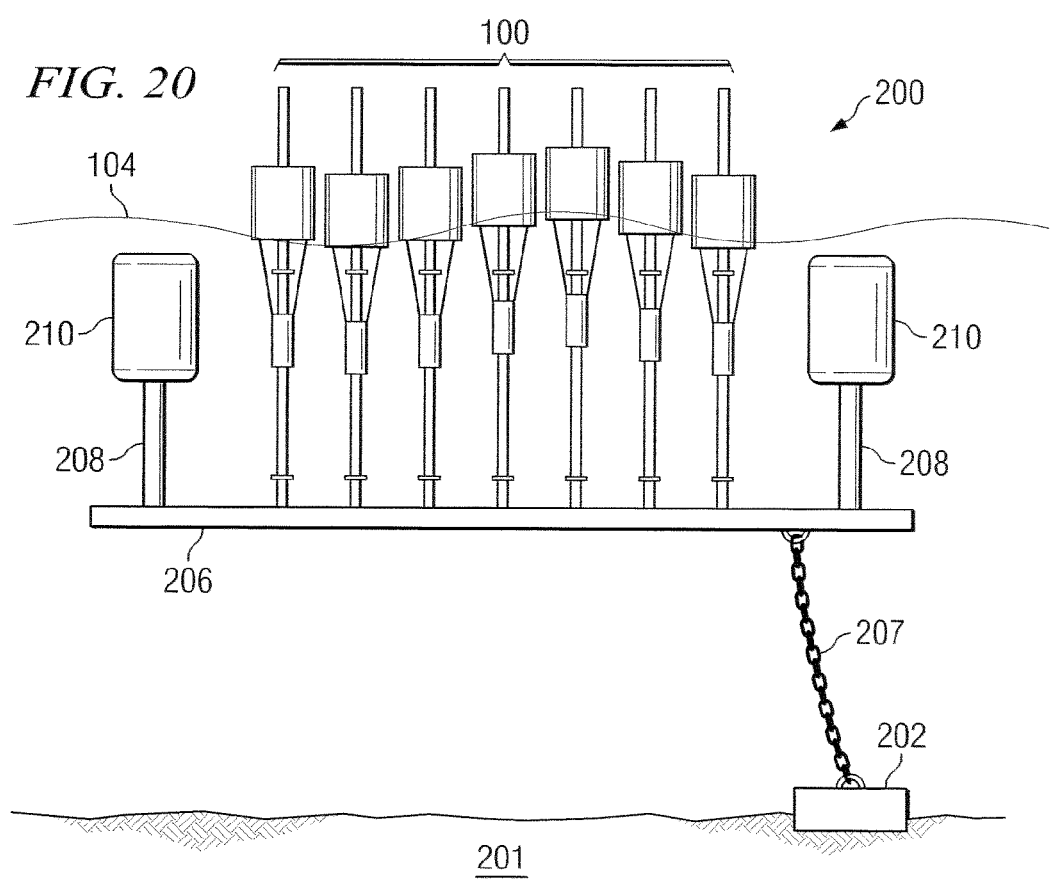
FIG. 20 illustrates a wave-energy conversion system.

With reference to FIG. 20, a wave energy conversion system 200 in accordance with another embodiment is shown. In this embodiment, the horizontal stabilization platform base 206 is attached to one or more tidal floats 210. The tidal floats 210 suspend the horizontal stabilization platform base 206 at a specified depth, relative to the tide level of the wave-medium 104. The horizontal stabilization platform base 206 is typically anchored to the ocean floor 201 using an anchor 202 and a chain 207. The anchor prevents the wave energy conversion system 200 from drifting beyond the reach of the chain 207.

It will be appreciated by those skilled in the art having the benefit of this disclosure that this invention provides a wave energy conversion system. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A method of converting wave-energy within a wave medium into electrical energy comprising:

positioning a plurality of wave energy conversion devices in a wave medium wherein each of the wave energy conversion devices includes a magnetic sleeve, an axle passing through the magnetic sleeve, at least one induction coil associated with the axle and having an axis substantially parallel to the axle, and a float member coupled to the magnetic sleeve such that a wave moving through the wave medium displaces the float member, moving the magnetic sleeve relative to the inductive coil and generating electrical energy within the inductive coil, and wherein each of the axles is attached to a tidal platform;

connecting the tidal platform to a base; and stabilizing the tidal platform with a tidal float connected to the tidal platform relative to the base and the surface of the wave medium to maintain the tidal platform at a stabilized depth below the wave medium surface, wherein the tidal float is coupled to the tidal platform providing less movement of the tidal platform relative to the float member.

2. The method of claim 1 further comprising the step of converting the electrical energy with a rectifier conductively connected the at least one inductive coil of each of the plurality of axles.

3. The method of claim 1 further comprising the step of supplying the electrical energy to an output device connected to the inductive coil.

4. The method of claim 1 further comprising the step of storing the electrical energy using a electrical storage device connected to the inductive coil.

5. The method of claim 4 wherein the storage device is one of a battery or capacitor.

6. A method of converting wave-energy within a wave medium into electrical energy comprising:

positioning a plurality of wave energy conversion devices in a wave medium wherein each of the wave energy conversion devices includes a magnetic sleeve, an axle passing through the magnetic sleeve, at least one induction coil associated with the axle and having an axis substantially parallel to the axle, and a float collar disposed around the axle and coupled to the magnetic sleeve such that a wave moving through the wave medium displaces the float collar, moving the magnetic sleeve relative to the inductive coil and generating electrical energy within the inductive coil, and wherein each of the axles is attached to a tidal platform;

connecting the tidal platform to a base;

connecting the axles to the base; and stabilizing the tidal platform with a tidal float connected to the tidal platform relative to the base and the surface of the wave medium to maintain the tidal platform at a stabilized depth below the wave medium surface, wherein the tidal float is coupled to the tidal platform providing less movement of the tidal platform relative to the float member.

7. The method of claim 6 wherein each of the axles is formed as a hollow rod.

8. The method of claim 7 wherein each of the inductive coils is positioned within one of the hollow rods.

9. The method of claim 6 wherein each of the magnetic sleeves is formed as a cylinder and disposed between a float collar and an axle.

10. The method of claim 6 further comprising converting the electrical energy with a rectifier conductively connected the at least one inductive coil of each of the plurality of axles; and, storing the electrical energy using a electrical storage device connected to the rectifier.

11. The method of claim 10 wherein the storage device is one of a battery or capacitor.

\* \* \* \* \*